T. W. KAISER.
DOUGH DIVIDING MACHINE.
APPLICATION FILED MAR. 26, 1908.

934,183.

Patented Sept. 14, 1909.
3 SHEETS—SHEET 1.

WITNESSES.

INVENTOR
T. W. Kaiser.

T. W. KAISER.
DOUGH DIVIDING MACHINE.
APPLICATION FILED MAR. 26, 1908.

934,183.

Patented Sept. 14, 1909.
3 SHEETS—SHEET 3.

WITNESSES

INVENTOR
T. W. Kaiser.

UNITED STATES PATENT OFFICE.

THOMAS WELLINGTON KAISER, OF TORONTO, ONTARIO, CANADA, ASSIGNOR TO GEORGE THOMAS PENDRITH, OF TORONTO, CANADA.

DOUGH-DIVIDING MACHINE.

934,183.　　　　　　　　Specification of Letters Patent.　　Patented Sept. 14, 1909.

Application filed March 26, 1908.　Serial No. 423,356.

*To all whom it may concern:*

Be it known that I, THOMAS WELLINGTON KAISER, of the city of Toronto, in the county of York, in the Province of Ontario, Canada, have invented certain new and useful Improvements in Dough-Dividing Machines, of which the following is the specification.

My invention relates to improvements in dough dividing machines such as that for which a patent was granted George Thomas Pendrith in the United States Patent Office under date of December 10, 1907, No. 873,682, and the object of the present invention is to devise a positive means for cutting off the required quantity of dough in pockets completely filled preparatory to the ejection of the dough therein by the plunger, and thus insure the loaf being of a uniform weight.

A further object is to provide means, whereby the amount of dough cut off may be varied to make different sizes or weights of loaves.

To effect these objects I have constructed my improved machine in the manner which I will now describe, reference being had to the accompanying drawings in which—

Figure 1:
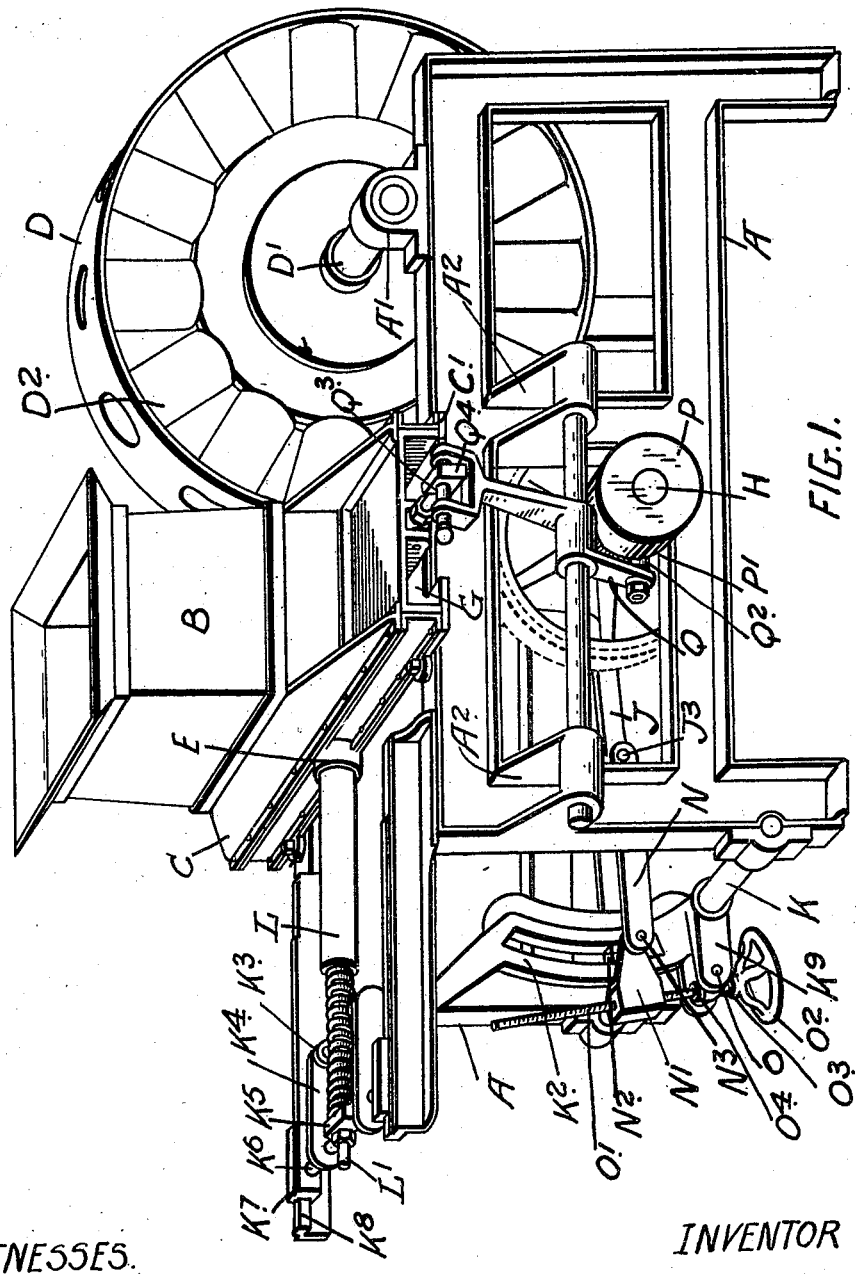
Figure 2:
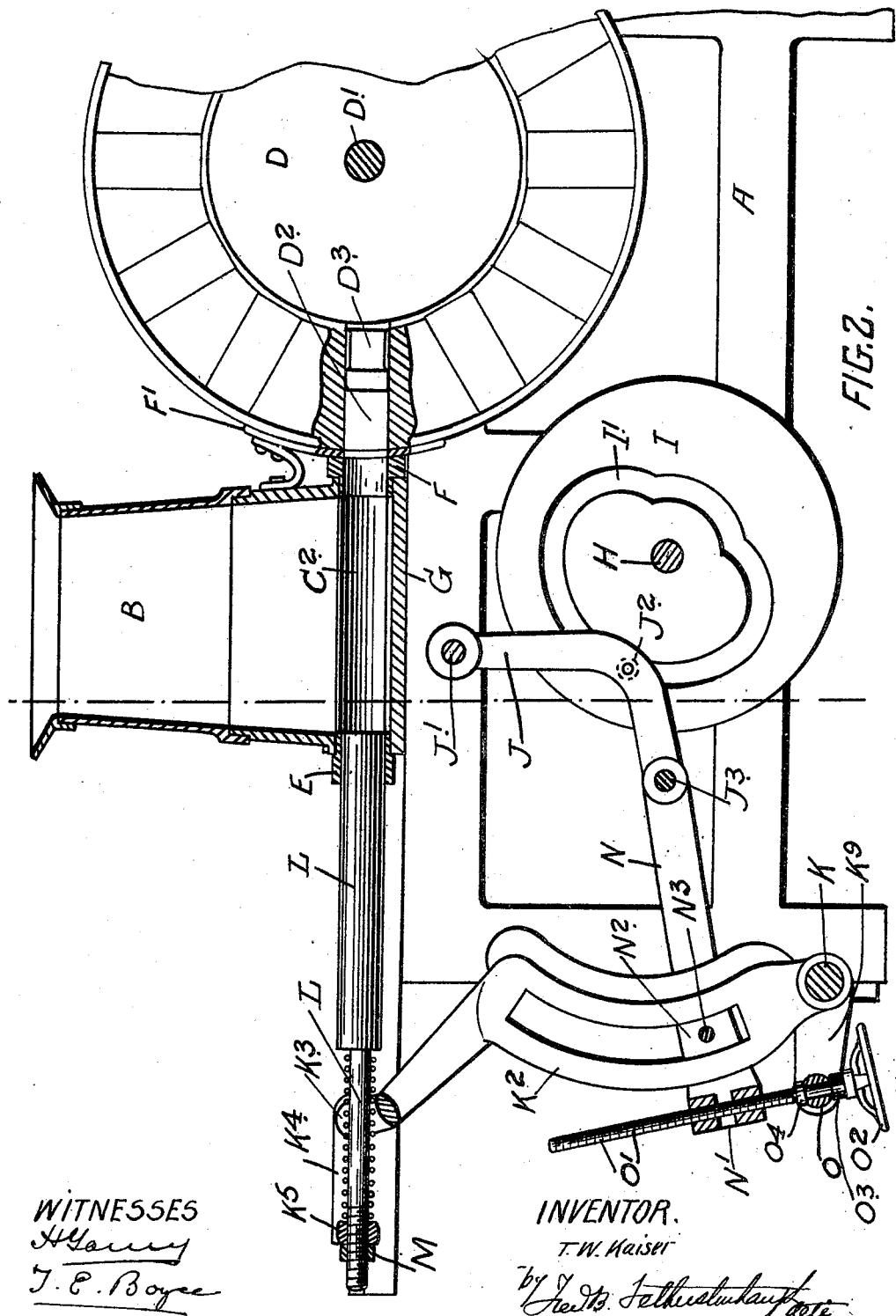
Figure 3:
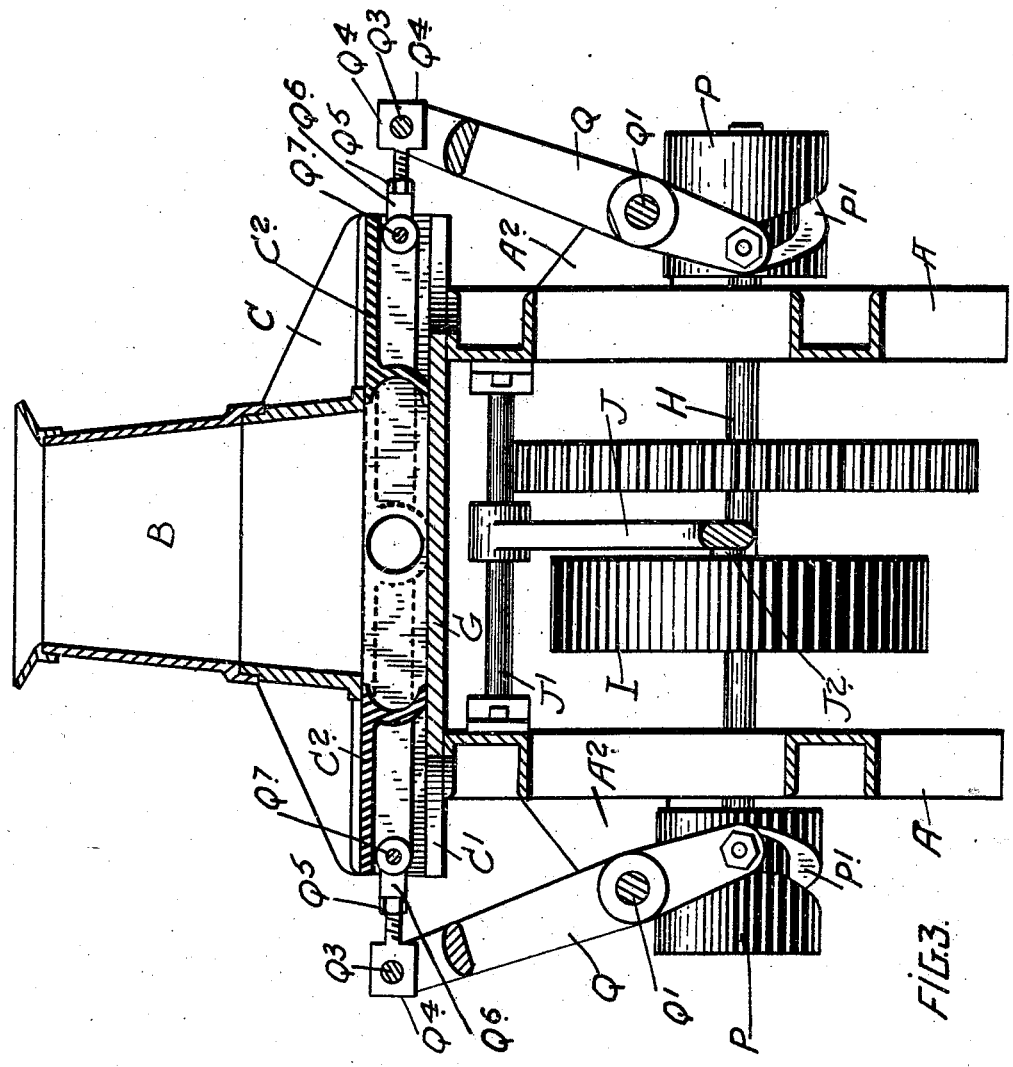

Figure 1, is a perspective view of my improved dough dividing machine. Fig. 2, is a longitudinal section. Fig. 3, is a cross section through the hopper showing the plungers forming the pocket when closed in their open position.

In the drawings like letters of reference indicate corresponding parts in each figure.

A A are the sides of the frame of the machine.

B is the hopper, which is supported on the cross frame C supported in turn by the sides A. The frame C has guide-ways C' in which are located the plungers C² having the concave semi-cylindrical ends.

D is a drum, which is rigidly mounted on the shaft D' journaled in bearings A' in the side bars of the frame A.

D² are a series of radially arranged molds in the drum D provided with plungers D³, which operate from a cam on the main shaft similar to that described in the application of Pendrith above referred to.

E is a cylindrical collar secured at the outside of the hopper and F is an annular collar secured at the inside of the hopper adjacent to the wheel.

G is the bottom of the hopper.

F' is the cut off plate secured to the inside of the annular collar F and formed concentric to the drum and practically abutting the same and suitably secured in position as indicated.

H is a counter shaft journaled in suitable bearings in the sides A of the frame and I is a cam secured to the shaft H and provided with a face cam groove I', which is journaled concentric to the shaft H at the two portions of its length opposite each other, the cam groove approaching from the larger radius of the groove to the smaller radius of the groove in two opposite curves.

J is a bell crank lever journaled on the shaft J' carried by the frame A and provided with a roller J², which is designed to run in a cam groove I'.

K is a cross shaft journaled at one end of the frame and carrying the arc-shaped slotted lever K' having the upper forked end K³ connected by links K⁴ to the cross bar K⁵ through which the spindle L' of the plunger L extends. The plunger L at the inner end extends through the annular collar E. The spindle L' is threaded at the outer end and extends through a nut M. The cross bar K⁵ has reduced ends K⁶ through which the links K⁴ extend, such cross bars terminating in blocks K⁷ which are supported upon and have movement upon the guiding rails K⁸.

N are links connected to the bars J³ at the lower end of the bell crank lever J. The links N are also connected at the opposite end to the straddle block N', the sides of which extend on each side of the slotted portion of the lever K².

N² is a block, which is located on the pin N³ extending through the outer ends of the link N.

O is a shaft extending through the projecting ends K⁹ of the lever K². The shaft O is loosely journaled in the projecting ends.

O' is a screw spindle provided with a hand wheel O² and fixed collars O³ and O⁴ on each side of the shaft O. The screw spindle O' extends through the outer end of the straddle block N' and is designed to turn freely in the shaft O without longitudinal movement. The threaded portion, however, of the screw spindle, which extends through the correspondingly threaded hole in the straddle block N' serves to adjust the straddle block and consequently the lever K², so that a greater or less throw may be imparted to the plunger L. The object of this greater or less throw is to accommodate the different consistencies of dough or provide for making a larger or smaller loaf or weight of loaf.

P are cam wheels secured on the shaft H and provided with peripheral grooves P'.

Q is a lever secured on the rock shaft Q' journaled in bearings A² projecting from the sides of the frame A. The lower end of the lever Q is provided with a roller Q², which extends into the cam groove P'. The upper end of the lever is forked and is provided with a pin Q³ extending through the fork.

Q⁴ is a bar having a reduced threaded inner end, which extends into the nut Q⁵ forming part of the link Q⁶, which is pivoted on a pin Q⁷ extending between the sides of the outer end of the plunger C².

It will now be seen that the rotation of the shaft H imparts by means of the cam wheels P a reciprocating movement to the plungers C² and L respectively. The cams are so formed and set, so that the movement is timed to occur as follows. Immediately after the outward movement of the plunger L the plungers C² are thrown together into the dotted position shown in Fig. 3, thereby cutting off the dough in the hopper at the bottom into a solid cylindrical form forcing the balance of the dough upwardly. When this has been accomplished the plunger L is caused to move forward and force the dough cut up through the cylindrical orifice formed by the ends of the plungers C² into the radially arranged mold D² opposite thereto, whereupon the plunger L moves backwardly again and the plungers C² open outwardly to receive another supply of dough.

What I claim as my invention is:

1. In a dough dividing machine, the combination with the drum, molds radially arranged therein and the plungers thereof suitably operated, of a hopper having a suitable bottom, two oppositely arranged plungers having recessed ends extending through the lower portion of the hopper at the bottom, means for reciprocating the plungers and means for transferring the dough from between the plungers to the molds in the drum as and for the purpose specified.

2. In a dough dividing machine, the combination with the drum, molds radially arranged therein and the plungers thereof suitably operated, of a hopper having a suitable bottom, two oppositely arranged plungers having recessed ends extending through the lower portion of the hopper at the bottom, levers connected to the outer ends of the plungers, a cross shaft, cams on the cross shaft suitably driven and having grooves into which the ends of the levers extend as and for the purpose specified.

3. In a dough dividing machine, the combination with the drum, molds radially arranged therein and the plungers thereof suitably operated, of a hopper having a suitable bottom, two oppositely arranged rectangularly formed plungers having recessed ends extending through the lower portion of the hopper, means for reciprocating such plungers and means for transferring the dough from between the plungers to the molds in the drum as and for the purpose specified.

4. In a dough dividing machine, the combination with the drum, molds radially arranged therein and the plungers thereof suitably operated, of a hopper having a suitable bottom, two oppositely arranged rectangularly formed plungers having recessed semi-cylindrical ends, means for reciprocating the plungers and means for transferring the dough from between said plungers to the molds as and for the purpose specified.

5. In a dough dividing machine, the combination with the drum, molds radially arranged therein and the plungers thereof suitably operated, of a hopper having a suitable bottom, two oppositely arranged rectangularly formed plungers having recessed semi-cylindrical ends, guide-ways for the plungers, means for reciprocating the plungers and means for transferring the dough from between the plungers to the molds as and for the purpose specified.

6. In a dough dividing machine, the combination with the drum, molds radially arranged therein and the plungers thereof suitably operated, of a hopper having a suitable bottom, two oppositely arranged rectangularly formed plungers having recessed semi-cylindrical ends, means for reciprocating the plungers, collars extending through the front and back of the hopper opposite the center of the molds in the drum, a plunger fitting the outer collar and having suitable guide-ways and means for reciprocating such plunger as and for the purpose specified.

7. In a dough dividing machine, the combination with the drum, molds radially arranged therein and the plungers thereof suitably operated, of a hopper having a suitable bottom, two oppositely arranged rectangularly formed plungers having recessed semi-cylindrical ends, means for reciprocating the plungers, collars extending through the front and back of the hopper opposite the center of the molds in the drum, a plunger fitting the outer collar and having suitable guide-ways, a lever pivoted in the frame and operatively connected to the plunger, a cam on the main shaft and means operated by the cam for locking the lever as and for the purpose specified.

8. In a dough dividing machine, the combination with the drum, molds radially arranged therein and the plungers thereof suitably operated, of a hopper having a suitable bottom, two oppositely arranged rectangularly formed plungers having recessed semi-cylindrical ends, means for reciprocating the plungers, collars extending through the front and back of the hopper opposite the center of the molds in the drum, a plunger fitting the outer collar and provided with a spindle, a cross head on the spindle and a spring on the spindle between the cross head and the plunger as and for the purpose specified.

9. In a dough dividing machine, the combination with the drum, molds radially arranged therein and the plungers thereof suitably operated, of a hopper having a suitable bottom, two oppositely arranged rectangularly formed plungers having recessed semi-cylindrical ends, means for reciprocating the plungers, collars extending through the front and back of the hopper opposite the center of the molds in the drum, a plunger fitting the outer collar and provided with a spindle, a cross head on the spindle and a spring on the spindle between the cross head and the plunger, links pivotally connected to the cross head, a lever pivoted at the lower end in the frame and pivotally connected at the upper end to the forward end of the links, a cam on the main shaft, and means for operating the lever from the cam as and for the purpose specified.

10. In a dough dividing machine, the combination with the drum, molds radially arranged therein and the plungers thereof suitably operated, of a hopper having a suitable bottom, two oppositely arranged rectangularly formed plungers having recessed semi-cylindrical ends, means for reciprocating the plungers, collars extending through the front and back of the hopper opposite the center of the molds in the drum, a plunger fitting the outer collar and provided with a spindle, a cross head on the spindle and a spring on the spindle between the cross head and the plunger, links pivotally connected to the cross head, a lever pivoted at the lower end in the frame and pivotally connected at the upper end to the forward end of the links, and having an arc-shaped slot therein and lower projections provided with a trunnion, a cam wheel on the counter shaft having a face groove, a bell crank lever journaled on a cross shaft and having a roller extending into the groove, links connected to the lower end of the bell crank lever, an arc-shaped block located on a pin extending between the links and in the slot in the lever, a block straddling the lever and pivotally connected to the ends of the links aforesaid and a screw spindle extending through a trunnion pivotally held in the projections formed on the lower end of the lever, and through the straddle block aforesaid as and for the purpose specified.

THOMAS WELLINGTON KAISER.

Witnesses:
B. BOYD,
R. OABAIN.